June 24, 1958    J. R. SQUIRE ET AL    2,840,069
PENETRATING INSTRUMENTS SUCH AS HYPODERMIC NEEDLES AND
THEIR USE IN AN IMBIBITION PRESSURE METER
Filed Sept. 22, 1955    2 Sheets-Sheet 1

INVENTORS:
JOHN RUPERT SQUIRE
DAVID STUART ROWE

By:
Stevens, Davis, Miller & Mosher

Attorneys

June 24, 1958 J. R. SQUIRE ET AL 2,840,069
PENETRATING INSTRUMENTS SUCH AS HYPODERMIC NEEDLES AND
THEIR USE IN AN IMBIBITION PRESSURE METER
Filed Sept. 22, 1955 2 Sheets-Sheet 2

INVENTORS:
JOHN RUPERT SQUIRE
DAVID STUART ROWE

By:
Stevens, Davis, Miller + Mosher

Attorneys

United States Patent Office 2,840,069
Patented June 24, 1958

2,840,069

PENETRATING INSTRUMENTS SUCH AS HYPODERMIC NEEDLES AND THEIR USE IN AN IMBIBITION PRESSURE METER

John Rupert Squire, Solihull, and David Stuart Rowe, Knowle, England, assignors to National Research Development Corporation, London, England, a British corporation Application September 22, 1955, Serial No. 535,927

Claims priority, application Great Britain September 25, 1954

8 Claims. (Cl. 128—2)

In some branches of science and industry there is a need for a penetrating instrument such as a hypodermic needle which will establish a large area of contact with the body or substance into which the instrument is inserted. Such a need arises in the measurement of imbibition pressure.

The present invention provides such an instrument and consists in forming the penetrating portion of the instrument as a tube of porous material the bore of which does not extend through the extremity of the penetrating portion which is pointed for incision. The porous material is preferably sintered metal.

This penetrating instrument therefore differs from a conventional hypodermic needle in that contact between the bore and the body or substance penetrated is made only through the pores of the sintered metal side and end walls of the tube.

Use is made of a penetrating instrument according to the invention in the measurement of imbibition pressure.

It has long been known that colloid gels exert an appreciable attractive force for additional water. It is also known that the interstitial space which lies between the blood vessels and the body cells of the human body is occupied by a "ground substance."

It is thought that this "ground substance" is probably a gel and as such it should exert an attractive force or imbibition pressure which may vary according to the condition of the body between a value greater than normal when the body is de-hydrated, to zero when the body is extremely water-logged. Such a pressure is very difficult to measure and requires extremely sensitive apparatus for its determination.

According to a further aspect of the present invention the bore of a porous penetrating instrument according to the invention is open to a chamber closed by a metal foil diaphragm which is connected to means capable of detecting small deflections, the chamber being connected through a tap to means for applying negative pressure and provided with pressure means.

The means for detecting small deflections preferably includes a mechano-electronic transducer valve having a movable anode mounted on a diaphragm closing the valve envelope and provided with a finger to which the metal foil diaphragm of the imbibition pressure meter is connected. Deflection of the metal foil diaphragm causes movement of the anode and a consequent change in the anode to cathode resistance of the valve which can be detected by a sensitive galvanometer in a Wheatstone bridge circuit of which the valve is included as one arm.

A penetrating instrument according to the present invention will now be described, by way of example, with reference to the accompanying drawings which also illustrate an imbibition pressure meter in which the penetrating instrument is employed. In the drawings.

Figure 1:
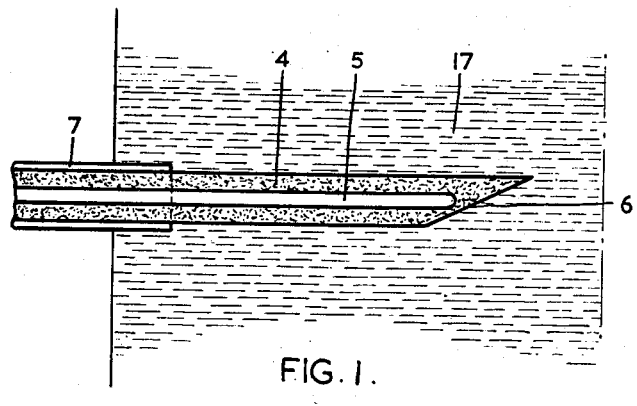
Figure 1 is a longitudinal sectional-view of the penetrating instrument shown inserted in a mass of gelatinous substance.

Referring first to Figure 1 the penetrating instrument has a penetrating portion 4 which is a tube of porous sintered metal the bore 5 of which does not extend through the extremity 6 of the penetrating portion which is pointed for incision in the usual manner.

A successful instrument has been made in nickel but probably other metals may be used. The desired porosity of the walls may be obtained in manufacture by normal powder metallurgy techniques for example by controlling the moulding pressure.

When the penetrating instrument is to be used as a hypodermic needle on the human body and possibly in other applications it is desirable that the external dimensions of the penetrating portion should be as small as possible. In such cases adequate mechanical strength can be obtained by making the bore very fine. The external dimensions need not then exceed those of hypodermic needles at present used in blood transfusion. In other cases too a fine bore may be desirable to restrict the internal volume of the instrument; for example, in measurement work.

The end of the penetrating portion remote from the point may be secured in any convenient mounting adapted to make external connections to the bore. If desired the part of the penetrating portion adjacent the mounting may be rendered impervious, for example, by sealing the pores of the sintered metal with a suitable material such as tin or a solder represented at 7 in Figure 1. The porous area of the penetrating portion may then be entirely contained within a body or substance 17 provided the instrument is inserted sufficiently far as shown in Figure 1.

Figure 2:
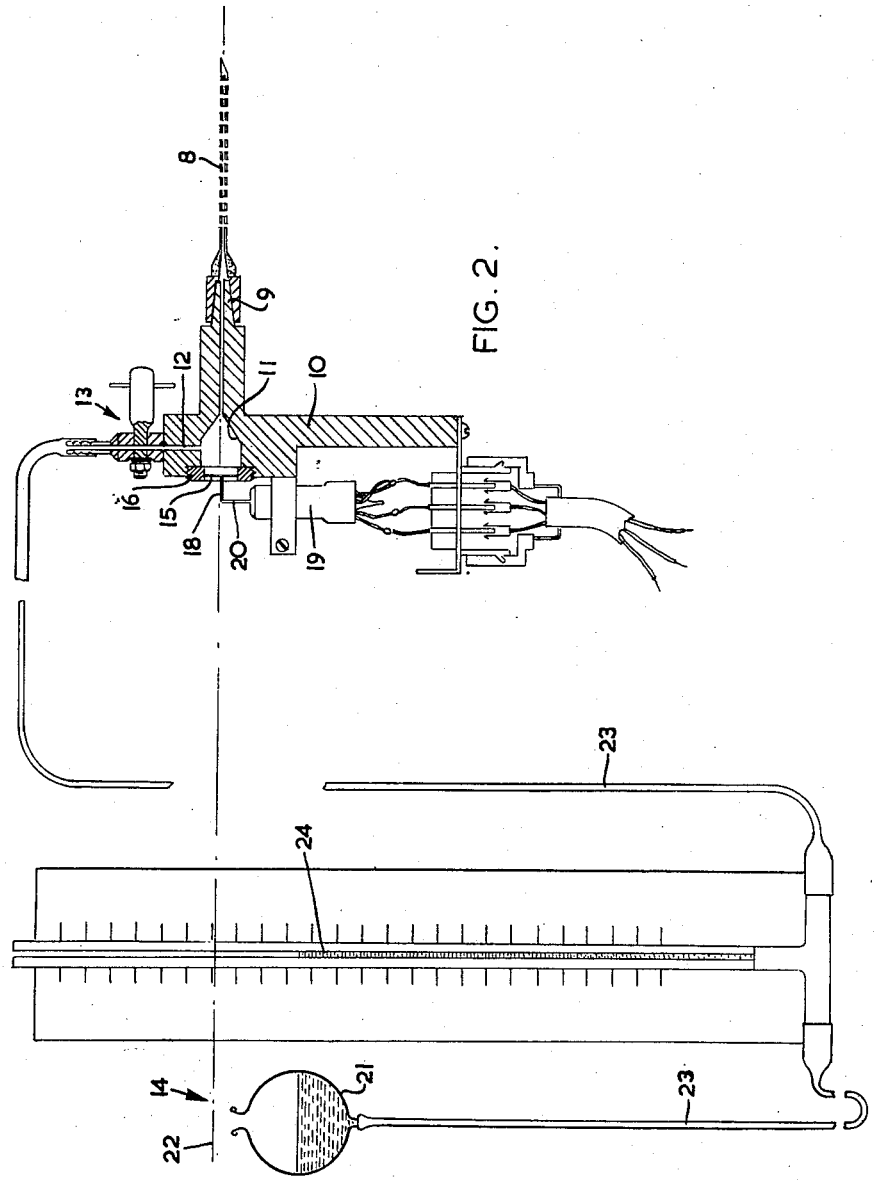
Figure 2 is a diagrammatic representation of the imbibition pressure meter with the penetrating instrument and the portion closely associated with it shown on an enlarged scale.

The penetrating instrument 8 of the imbibition pressure meter illustrated in Figure 2 is provided with a taper socket by which it is detachably mounted on a frustoconical adapter 9 secured to or integral with a rigid block of metal 10 in which a chamber 11 of truncated conical shape is formed. The truncated end is open through the adaptor 9 to the bore of the penetrating instrument 8. A lateral passage 12 leads to a tap 13 and through the tap to pressure varying means 14.

The chamber 11 is closed at the large diameter end by a metal foil diaphragm 15 which is held in place by a Phosphor bronze screw-threaded retaining ring 16. The centre of the metal foil diaphragm is connected by a spring blade 18 to the finger 20 of a mechano-electronic transducer valve 19 (Radio Corporation of America type 5734) rigidly mounted on the block 10.

The finger 20 of the mechano-electronic transducer valve 19 details of which are not illustrated is provided on a diaphragm closing the valve envelope. The diaphragm carries within the envelope a movable anode. Deflections of the metal foil diaphragm 15 causes movement of the anode and a consequent change in the anode to cathode resistance of the valve 19.

Figure 3:
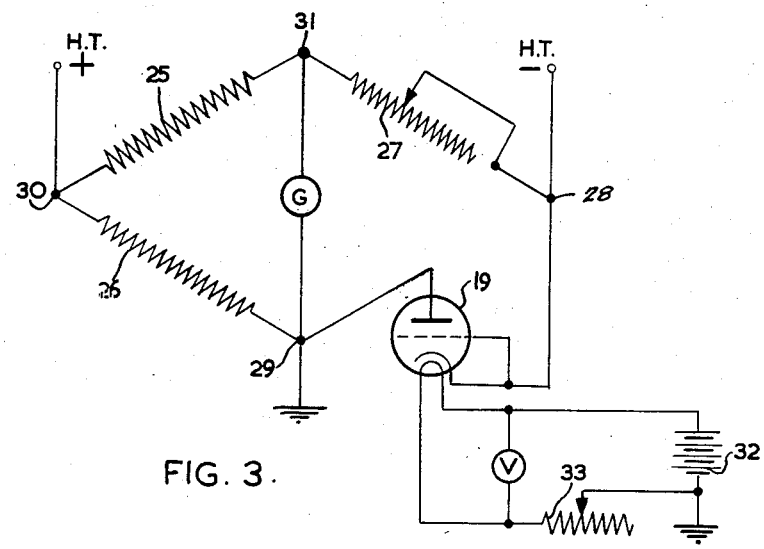
Figure 3 shows a bridge circuit for use with the imbibition pressure meter of Figure 2.

To detect this change of resistance the anode and cathode of the transducer valve 19 are connected as one arm of the Wheatstone bridge circuit shown in Figure 3 of the accompanying drawings. The other arms comprise respectively fixed resistors 25 and 26 and a variable resistor 27 forming a balancing arm, which are connected together at junctions 28, 29, 30, 31. Junctions 30 and 28 are joined respectively to positive and negative of a high tension D. C. supply, junctions 29 and 31 are joined through a sensitive galvanometer G and point 29 is grounded. The heater of the transducer valve is supplied from a source 32 through a variable resistor 33. A voltmeter V is provided to indicate the potential difference across the heater element which it is important to keep constant to ensure stability.

The tap 13 on closing must cause as little change of pressure in the chamber as possible. It may be rotary as illustrated or a slide valve with a through passage adapted to connect a pair of ports together in one position of the valve.

The means for applying negative pressure 14 may simply comprise a reservoir 21 adapted to be raised and lowered about the datum 22 of the penetrating instrument 8 and connected by a flexible tube 23 to the tap 13 and a simple manometer tube 24 for pressure measurement.

The system is filled with saline solution and in use the porous penetrating instrument is thrust into a block of jelly (e. g. 5% gelatin) or under the skin making a fairly large area of contact between saline and the surrounding gel. The negative pressure is adjusted by raising or lowering the reservoir 21 until upon closing the tap 13 no appreciable deflection of the metal foil diaphragm occurs. There is then no transfer of saline through the porous wall of the penetrating instrument and the manometer reading gives the imbibition pressure.

The sensitive instrument provided by the present invention enables imbibition pressure to be measured with considerable accuracy. It has applications in hospital work and in the chemical industry.

Another possible application of the porous penetrating instrument according to the invention which however has not yet been investigated is in the intravenous administration of oxygen. In existing techniques excessively large globules of oxygen are sometimes injected into the blood stream and it is thought that with an instrument according to the present invention better diffusion of oxygen should be possible.

We claim:

1. A penetrating instrument having a penetrating portion of porous tubular material with an extremity pointed for incision, the bore of the tube being adapted at one end for external connection and extending towards but not through said pointed extremity.

2. A penetrating instrument, such as a hypodermic needle, wherein the penetrating portion of the instrument is a tube of porous sintered metal the bore of which tube does not extend through the extremity of the penetrating portion which is pointed for incision.

3. A penetrating instrument comprising in combination a penetrating portion having an extremity pointed for incision, and supporting means mounting said penetrating portion, the penetrating portion being composed of a tube of porous sintered metal the bore of which does not extend through the pointed extremity, the other end of the penetrating portion being adapted for engagement with the supporting means, and a part of the porous sintered metal adjacent the supporting means and extending slightly towards the pointed extremity being rendered impervious.

4. A penetrating instrument according to claim 3 wherein the porous sintered metal is rendered impervious by sealing with a metal such as solder.

5. An imbibition pressure meter including a penetrating instrument according to claim 3 and further comprising a rigid body block having a portion forming said supporting means, a chamber within said body block closed by a diaphragm and open to the bore of the penetrating instrument, a valve, means for applying negative pressure, means for measuring said negative pressure, means for connecting said means for applying and measuring said negative pressure through said valve to said chamber, means for detecting small deflections and means for affecting said sensitive detecting means by deflections of said diaphragm.

6. An imbibition pressure meter comprising penetrating means for porous tubular material closed at one extremity and pointed for incision, a rigid body block having a portion supporting said penetrating means, a valve rigidly supported by said body block, a chamber within said body block closed by a metal foil diaphragm and open to the bore of said penetrating means, there being a passage connecting said chamber to said valve, means for applying negative pressure, means for measuring said negative pressure, means for connecting said means for applying and measuring said negative pressure through said valve to said chamber, means for detecting small deflections and means for affecting said sensitive detecting means by deflections of said diaphragm.

7. An imbibition pressure meter comprising penetrating means of porous tubular material closed at one extremity and pointed for incision, a rigid body block having a portion supporting said penetrating means, a valve rigidly supported by said body block, a truncated conical compartment within the body block closed at the large diameter end by a thin diaphragm and open at the truncated end to the bore of said penetrating means, there being a passage connecting said chamber to said valve, means for applying negative pressure, means for measuring said negative pressure, means for connecting said means for applying and measuring said negative pressure through said valve to said chamber, means for detecting small deflections and means for affecting said sensitive detecting means by deflections of said diaphragm.

8. An imbibition pressure meter comprising penetrating means of porous tubular material closed at one extremity and pointed for incision, a rigid body block having a portion supporting said penetrating means, a valve rigidly supported by said body block, a chamber within said body block closed by a metal foil diaphragm and open to the bore of said penetrating means, there being a passage connecting said chamber to said valve, means for applying negative pressure, means for measuring said negative pressure, means for connecting said means for applying and measuring said negative pressure through said valve to said chamber, a mechano-electronic transducer valve rigidly mounted with respect to said body block and having a movable anode, means for moving said movable anode responsive to deflections of said diaphragm.

References Cited in the file of this patent

UNITED STATES PATENTS 2,600,324     Rappaport _____ June 10, 1952